(12) United States Patent
Ponziani (10) Patent No.: US 9,457,802 B2
(45) Date of Patent: Oct. 4, 2016

(54) TURN SIGNAL CONTROLLED REGENERATIVE BRAKING AND DECELERATIVE LOADING

(76) Inventor: Richard Louis Ponziani, Centerville, OH (US)

( * ) Notice: Subject to any disclaimer, the term of this patent is extended or adjusted under 35 U.S.C. 154(b) by 0 days.

(21) Appl. No.: 13/441,584

(22) Filed: Apr. 6, 2012

(65) Prior Publication Data
US 2013/0268162 A1    Oct. 10, 2013

(51) Int. Cl.
*B60W 30/00*   (2006.01)
*B60W 10/30*   (2006.01)
(Continued)

(52) U.S. Cl.
CPC ............. *B60W 30/00* (2013.01); *B60L 7/12* (2013.01); *B60L 7/26* (2013.01); *B60L 11/123* (2013.01); *B60L 11/14* (2013.01); *B60L 11/1861* (2013.01); *B60L 15/2009* (2013.01); *B60W 10/04* (2013.01); *B60W 10/06* (2013.01); *B60W 10/08* (2013.01); *B60W 10/10* (2013.01); *B60W 10/18* (2013.01); *B60W 10/184* (2013.01); *B60W 10/198* (2013.01); *B60W 10/30* (2013.01); *B60W 30/18109* (2013.01); *B60W 30/18127* (2013.01); *B60W 30/18136* (2013.01); *B60L 2240/423* (2013.01); *B60L 2240/443* (2013.01); *B60L 2240/486* (2013.01); *B60L 2240/622* (2013.01); *B60L 2250/16* (2013.01); *B60L 2250/26* (2013.01); *B60Q 1/44* (2013.01); *B60W 2030/18081* (2013.01); *B60W 2540/20* (2013.01); *B60W 2550/402* (2013.01); *B60W 2710/0666* (2013.01); *B60W 2710/083* (2013.01); *B60W 2710/105* (2013.01); *Y02T 10/6217* (2013.01); *Y02T 10/645* (2013.01); *Y02T 10/705* (2013.01); *Y02T 10/7005* (2013.01); *Y02T 10/7044* (2013.01); *Y02T 10/7077* (2013.01); *Y02T 10/72* (2013.01); *Y02T 10/7275* (2013.01); *Y02T 10/7291* (2013.01); *Y02T 90/16* (2013.01); *Y02T 90/162* (2013.01)

(58) Field of Classification Search
CPC .... B60W 10/08; B60W 10/18; B60W 10/30; B60W 30/18109; B60W 10/198
USPC .............. 701/48, 36, 52, 70, 51, 99, 1–2, 54
See application file for complete search history.

(56) References Cited

U.S. PATENT DOCUMENTS

| | | |
|---|---|---|
| 4,351,405 A | 9/1982 | Fields et al. |
| 5,078,227 A | 1/1992 | Becker |

(Continued)

OTHER PUBLICATIONS

Auto-Dry Brakes; http://www.cadillac.com/autodry.html; Copyright © 2014 General Motors; printed Mar. 6, 2014; p. 1.

*Primary Examiner* — Nga X Nguyen
(74) *Attorney, Agent, or Firm* — Hasse & Nesbitt LLC; Daniel F. Nesbitt (57) ABSTRACT

A vehicle executing a turn will most likely be slowed down before the turn and when a driver activates a turn signal to indicate the turn, a vehicle internal controller uses this information to engage regenerative braking for energy recapture while slowing down the vehicle for the pending turn. Since the turn signal is usually activated very early in the turn event, and turns are an ongoing, frequent part of driving, a greater overall vehicle efficiency can be realized without special effort from the driver. Implementation is relatively simple for the manufacturer and adds no cost since the controllers and sensors are already installed on nearly all roadworthy vehicles. Fuel mileage and vehicle driving ranges are improved on a large scale and brake system wear is reduced.

9 Claims, 8 Drawing Sheets (51) Int. Cl.

| | | |
|---|---|---|
| *B60W 10/18* | (2012.01) | |
| *B60W 10/04* | (2006.01) | |
| *B60W 10/10* | (2012.01) | |
| *B60W 10/184* | (2012.01) | |
| *B60W 10/198* | (2012.01) | |
| *B60W 30/18* | (2012.01) | |
| *B60W 10/06* | (2006.01) | |
| *B60W 10/08* | (2006.01) | |
| *B60L 7/12* | (2006.01) | |
| *B60L 7/26* | (2006.01) | |
| *B60L 11/12* | (2006.01) | |
| *B60L 11/14* | (2006.01) | |
| *B60L 11/18* | (2006.01) | |
| *B60L 15/20* | (2006.01) | |
| *B60Q 1/44* | (2006.01) | |

(56) References Cited

U.S. PATENT DOCUMENTS

| | | | |
|---|---|---|---|
| 6,085,137 A * | 7/2000 | Aruga | F16H 59/66 477/120 |
| 6,208,927 B1 * | 3/2001 | Mine et al. | 701/70 |
| 6,516,925 B1 | 2/2003 | Napier et al. | |
| 6,866,350 B2 | 3/2005 | Palmer et al. | |
| 7,047,120 B2 | 5/2006 | Perach et al. | |
| 8,265,850 B2 | 9/2012 | Shin | |
| 2001/0041959 A1 * | 11/2001 | Satou et al. | 701/70 |
| 2013/0190972 A1 * | 7/2013 | Pribula et al. | 701/36 |

\* cited by examiner

TURN SIGNAL CONTROLLED REGENERATIVE BRAKING AND DECELERATIVE LOADING

BACKGROUND OF THE INVENTION

This invention relates in general to the control of vehicle regenerative braking and deceleration, using the turn signal activation status as input.

As a normal course of driving a vehicle on public roadways, a driver directs the vehicle to a destination through a combination of straight travel and turns. Left and right turns of all kinds are just a normal, ongoing part of driving. As a vehicle on a roadway is approaching an intended turn and before the turn is executed, the driver will usually slow the vehicle from a normal driving speed to a lower speed that is appropriate to safely execute the turn. The execution of a turn therefore requires the driver to anticipate, plan, and act well before the actual turn is made. These steps usually consist of the following: Remove the foot from the throttle, and then apply the foot brake if necessary to achieve a lower speed, release the foot brake and then turn the steering wheel to execute the turn, and then straighten out the steering wheel and re-apply the throttle to complete the turn event. In addition, the driver is required by law to turn on the directional turn signal at a distance before the turn is executed. The main function of the turn signal is to communicate a near term future intended vehicle path to surrounding drivers, thus allowing them to react accordingly to the impending turn. This serves to prevent ambiguity and confusion between drivers, prevents the need for abrupt action countermeasures and reduces the risk of a crash. Use of the turn signal is required by law to be activated a minimum of 100 feet before a turn in most jurisdictions and good practices would dictate a turn signal to be activated approximately 300 to 600 feet before the turn to be an effective communication means to surrounding drivers.

A driver of a vehicle applying the foot brake before a turn will slow the vehicle by converting a portion of the kinetic energy of a vehicle in motion into heat at the designed-in brake friction surfaces. Not only is this heat energy dissipated through the components of the vehicle and eventually to the atmosphere, but brake frictional surfaces experience wear each time the brake is applied and with normal ongoing use. The brake system components eventually will need to be replaced as they wear out and the more frequently the brakes are used and the greater the pressure applied, the sooner the components will wear out. It should be noted there are other speed-reducing forces that will inherently slow down the vehicle that are always present when the vehicle is moving, including aerodynamic drag, rolling resistance of the tires, and internal friction of moving vehicle components and thus, these forces are not relevant to the discussion in this specification due to their ubiquitous and unavoidable presence.

When the driver wants to slow the vehicle down, in particular when approaching a turn, there are methods other than the use of the foot brake to achieve this. These are active means of vehicle deceleration that require a conscious engagement from the driver and will then introduce a reverse torque load at the wheels, thus reducing the speed of the vehicle. Using means other than the foot brake to slow the vehicle reduces the wear on the brakes and extends the life of those related components. One method is for the driver shift the transmission to a lower selected gear which increases engine speed and the higher revving engine will slow the vehicle. In a vehicle equipped with a continuously variable transmission, the ratio can be changed to a higher effective ratio which increases engine speed and thus the higher revving engine will slow the vehicle. In a vehicle with a diesel engine that is so equipped, an exhaust brake may be engaged which introduces increased engine back pressure and thus will slow the vehicle. Also in a diesel vehicle, a compression release engine brake can be engaged resulting in a slowing of the vehicle. In a hybrid electric vehicle (HEV) or an electric vehicle (EV), regenerative braking can be engaged which will result in a slowing of the vehicle. The magnitude of the regenerative braking can be controlled by vehicle design and computer software algorithm combined with the normal, on-the-road driver inputs. Regenerative braking has the added benefit of being able to store a portion of the vehicle's forward motion kinetic energy such that the stored energy can be used at a later time to propel the vehicle.

In the case of the HEV or EV, the manufacturer's design of the vehicle with respect to active means of deceleration, e.g. regenerative braking, presents a dilemma in terms of a design compromise. The recapture and storage of kinetic energy is beneficial, but only when the driver wants to slow the vehicle at a higher rate of deceleration. There are driving situations where simply coasting the vehicle to a lower speed is more appropriate than using regenerative braking, particularly for improving overall fuel economy. Coasting, which is sometimes referred to as gliding, is a method of simply using the vehicle's forward motion kinetic energy to continue to propel the vehicle with minimal drive train negative torque input until a lower speed desired by the driver is achieved. This method is highly efficient when compared to regenerative braking for ultimate kinetic energy utilization, as coasting is near 100% efficient, whereas the regenerative braking-storage-restored kinetic energy cycle is only about 30 to 60% efficient. In comparison, using friction foot brakes would be considered about 0% efficient since energy is converted to heat and dissipated to the atmosphere.

Therefore, the dilemma for the manufacturer designing a HEV or EV is how to control coasting and how to control regenerative braking with a proper balance with respect to driver's controls and timely needs in particular driving situations. A vehicle manufacturer's design dictates the amount of regenerative braking and the amount of coasting that a HEV or EV will exert under various driving circumstances. With fixed design parameters established with computer control algorithms, inputs from the driver combined with vehicle dynamics then determine the regenerative braking profile. A manufacturer must consider drivability, driver skill levels, driver interaction to vehicle function and operation, vehicle internal complexity, cost, overall fuel mileage, safety, vehicle durability and reliability among other considerations when designing these controls. At one extreme, a vehicle manufacturer could design the vehicle such that the regenerative braking is at or near a maximum when a driver releases the throttle to zero percent, that is, removes the foot from the throttle. With this type of throttle lift, the entire vehicle including the driver and any passengers will likely experience a very high rate of deceleration. In this design compromise scenario, maximum regenerative braking is occurring and minimal coasting is occurring. Thus, in a HEV, battery maximum capacity may be reached very frequently, thereby reducing the opportunity to recapture forward motion kinetic energy of the moving vehicle. This also may compromise the drivability of the vehicle with frequent, sudden decelerations when the driver's foot is lifted off the throttle. This design is prone to result in a jerky ride with aggressive fore and aft movements. Furthermore, the opportunity to translate forward motion energy into forward motion with coasting is not present. Also, throttle-position-induced rapid deceleration can create the situation whereby a rear end crash from a following driver is an ever-present risk, or the vehicle may experience instability. At least one commercially sold vehicle, the Tesla Roadster EV, has designed such a vehicle with maximum regenerative braking and has equipped the vehicle so that the brake lights are illuminated while under the throttle-position-induced rapid deceleration conditions described.

Other manufacturers' design with a combination of regenerative braking and coasting and consists of two states of operation that can be induced by the driver's inputs: In the first state, when a driver lifts their foot off the throttle, a minimal amount of regenerative braking occurs. But when the brake pedal is depressed in the first approximately 30% threshold of the brake pedal travel, then a progressive level of regenerative braking is introduced. In this design, brake pedal travel past the threshold engages the conventional friction brake system of the vehicle in conjunction with the regenerative braking. There exists a second state of this design when the driver's foot is lifted from the throttle, then momentarily taps the throttle pedal to then engage a coasting mode. In this state, minimal, if not zero magnitude induced drivetrain load or regenerative braking exists, thereby making maximum use of forward kinetic energy to propel the vehicle most efficiently. While the second state maximizes overall efficiency by utilizing the coasting feature, a majority of drivers will not make the conscious effort to engage this second state, thereby missing the opportunity to optimize on a large population of these vehicles. The aforementioned design approach is utilized on the current model of the Toyota Prius HEV.

Still another compromise design method of present HEV and EV manufacturers is to have a driver selectable switch whereby fixed mode profiles with predetermined levels of coast, regenerative braking and friction braking. These selectable operational modes are available to the driver such that greater or lesser magnitudes of regenerative braking levels are induced with normal driving and specifically lifting the throttle, depending on the mode selected. The driver must make a choice of one or more modes and this selectable approach does not allow the vehicle to be automatically adaptable to the situation. This approach also misses the opportunity to optimize on a large population of vehicles. The aforementioned design approach is utilized on the current model of the Nissan Leaf EV.

In the case of a conventional engine/transmission vehicle with no internal means to convert and store vehicle forward kinetic energy, there is still an advantage to being able to slow the vehicle through downshifting or other means when approaching a turn. This would create the advantage of less wear on the friction brake system components. Less wear means less heat and thus a longer time between component wear-out and vehicle service.

While all of these methods of achieving vehicle deceleration and regenerative braking are designed by the manufacturer and are executed by a driver's actions while normally driving the vehicle, all vehicle systems are reactionary to realtime vehicle dynamics resulting predominately from the driver's throttle, brake, and steering inputs. It remains an overriding and ongoing design challenge to extract greater vehicle efficiency and is requiring that both manufacturers and drivers seek incremental ways to improve both fuel mileage and vehicle range and methods that adapt automatically to optimize efficiency are the most desirable. Thus, the pursuit of further optimizing regenerative braking systems is a worthwhile effort, with benefits to be gained for all interested parties. Fuel mileage is taking on a more and more important role and the United States Environmental Protection Agency corporate average fuel economy (CAFE) benchmarks continue to climb so vehicle manufacturers must therefore pursue cost effective means of improving fuel economy in all conceivable areas. Energy efficiency and energy management, specifically when a vehicle is engaged in a turning event, is where the prior art is non-existent and therefore has potential for improvement. None of the approaches outlined, nor any other prior art recognizes or utilizes the synergy of a driver's activated turn signal as an early indicator to the vehicle control system that the driver is intending to slow down, then take advantage of this information to optimize energy resource management regarding the turn event.

What is needed therefore is a cost effective system whereby the vehicle could accurately and automatically anticipate when a driver is about to execute a turn and thus optimize regenerative braking and/or energy dissipative braking well before the turn is executed. These functions in various combinations could result in greater energy recapture of forward motion kinetic energy and thus increase fuel economy, increase a manufacturer's CAFE numbers, increase vehicle range, reduce operating costs, improved vehicle drivability, promote the proper use of the turn signal and reduce the wear on the friction braking system.

BRIEF SUMMARY OF THE INVENTION

It is an object of the present invention to increase overall vehicle propulsion efficiency of a hybrid electric vehicle (HEV) or electric vehicle (EV) such that the driver's normal practice of using a turn signal would serve to recapture a greater amount of forward motion kinetic energy by engaging regenerative braking appropriately and thus slowing down the vehicle in anticipation of a turn. It is further an object to reduce the use of friction braking in all types of vehicles when a driver executes a turn by allowing the vehicle to anticipate a turn via the use of a turn signal and therefore introducing a more effective slow down means at a distance before the turn. An additional object of the present invention allows a driver to have greater vehicle control via the turn signal lever in order to actively control the slow-down of a vehicle before a turn. It is yet another object of the present invention to be integrated into a vehicle such that the overall cost impact on the product is minimized or unaffected. It is also an object of the present invention to maintain or improve vehicle drivability. It is further an object of the present invention to utilize the coinciding related events of turns, driver-initiated turn signal activation, and vehicle slow down to improve the overall performance of the vehicle. It is also an object of the present invention to allow the system to adapt to a driver's personal habits when turning to further optimize fuel economy and/or vehicle range based upon those habits. It is further an object of the present invention to incentivize the driver to acquire and/or maintain the good habit of utilizing the turn signal when executing a turn event. It is yet another objective of the present invention to automatically engage then disengage friction brakes upon turn signal activation during inclement driving conditions such that when the foot brake is applied, the brake surfaces are drier and would be thus more effective at decelerating the vehicle.

One aspect of the present invention is directed to a vehicle that is powered, at least in part, by an electric propulsion motor that is also designed with regenerative braking capability, e.g. a REV, an EV, a plug-in HEV or a Fuel Cell EV. The present invention improves the application of regenerative braking and thus improves overall vehicle propulsion efficiency. Regenerative braking is a very important aspect of attaining overall efficiency of these types of vehicles. In the case of the HEY, fuel economy is one of the most important attributes and in the case of the EV, range is one of the most important attributes. A regenerative braking system in a vehicle recaptures otherwise lost vehicle forward motion kinetic energy when slowing down and is designed by the vehicle manufacturer to be as effective as possible, while still maintaining a satisfying and safe driving experience.

The present invention can improve the overall regenerative braking effect by extending the duration and increasing the magnitude of the regenerative braking of a vehicle during the time just before the execution of a turn, when the vehicle is normally in a slow-down mode. A typical driver's sequence of an approach to the turn cycle event consists of the following steps (although not necessarily in the order listed): turn signal on; throttle off; foot brake on; rotate steering wheel to turn vehicle. In the present invention, a higher magnitude of regenerative braking would be introduced and would be engaged at the point when the turn signal is activated and thus could occur sooner and at a greater magnitude than usual in the turn cycle. This serves several functions as compared to a traditional regenerative system: increasing the recapture and storage of vehicle forward motion kinetic energy; actively slowing the vehicle for the turn; and reducing component wear on the vehicle friction braking system.

A vehicle manufacturer employing the present invention would design the turn signal actuated regenerative braking such that the deceleration rate is appropriate for most turns and that the driving experience during a turning cycle event is more efficient and is also satisfying from the driver's perspective. Since the driver is obliged by law to use a turn signal, the driver using a turn signal would therefore experience the benefit of an increased efficiency of the vehicle without having to perform additional energy saving active measures. In a HEV, the driver would experience greater fuel efficiency just from normal use of the turn signal. In an EV, the driver would experience a greater vehicle range just from normal use of the turn signal. Since the additional regenerative braking will increase the vehicle deceleration by use of the turn signal, it is important to note that the normal rear external turn signal flashing light serves as a visible warning to alert a following driver that the vehicle is slowing at a higher than normal rate.

A further aspect of the system would allow the driver to activate the turn signal a second, third, or more times in the same turn cycle event such that repeated, successive activations of the turn signal via the turn signal lever would maintain the flashing turn signal lighting, yet further increase the regenerative braking magnitude with each driver's turn signal activation. This would allow a driver to exercise greater control of the regenerative braking to sequentially increased levels such that the requirement for the foot brake is reduced further, and may in some turn events, allow for no application of friction brakes at all. In the case of the repeated activations of the turn signal, activation of the rear facing brake light system could, by manufacturer's design, illuminate at predetermined conditions in order to alert a following driver of a higher rate of deceleration. The brake lights would illuminate independent of foot brake activation. There is a segment of the driving public, sometimes referred to as Hypermilers that would appreciate the option to be able to actively optimize the efficiency of their vehicle and these drivers would have this option at their fingertips to achieve this level of added control. The vehicle manufacturer can design these systems into the vehicle at little or no added cost.

Another aspect of the present invention is directed to a conventional internal combustion engine/transmission equipped vehicle. In the same typical driver's sequence stated above, the driver's activation of the turn signal would activate a downshift of the transmission in order to increase the slow down effect on the vehicle and thus reduce the component wear on the vehicle friction foot braking system.

Other aspects of the system and/or methods according to the embodiments will be or become apparent to one with skill in the art upon review of the following drawings and detailed description. It is intended that all such additional systems and/or methods be within the scope of the present invention, and be protected by the accompanying claims.

BRIEF DESCRIPTION OF THE DRAWINGS

FIG. 3 depicts an example of a relationship of vehicle drivetrain resistance load vs. time for a driver's input sequence consisting of: turn signal on; throttle off; regenerative foot brake on; friction foot brake on.

FIG. 4 depicts an example of a relationship of vehicle drivetrain resistance load vs. time for a driver's input sequence consisting of: throttle off; turn signal on; regenerative foot brake on; friction foot brake on.

FIG. 5 depicts an example of a relationship of vehicle drivetrain resistance load vs. time for a driver's input sequence consisting of: throttle off; regenerative foot brake on; friction foot brake on; turn signal on.

FIG. 6 depicts an example of a relationship of vehicle drivetrain resistance load vs. time for a driver's input sequence consisting of: turn signal on; throttle off; throttle on; throttle off; regenerative foot brake on; friction foot brake on.

FIG. 7 depicts an example of a relationship of vehicle drivetrain resistance load vs. time for a driver's input sequence consisting of: throttle off; turn signal on; turn signal re-activated; regenerative foot brake on; friction foot brake on.

DETAILED DESCRIPTION OF THE INVENTION

Figure 1:
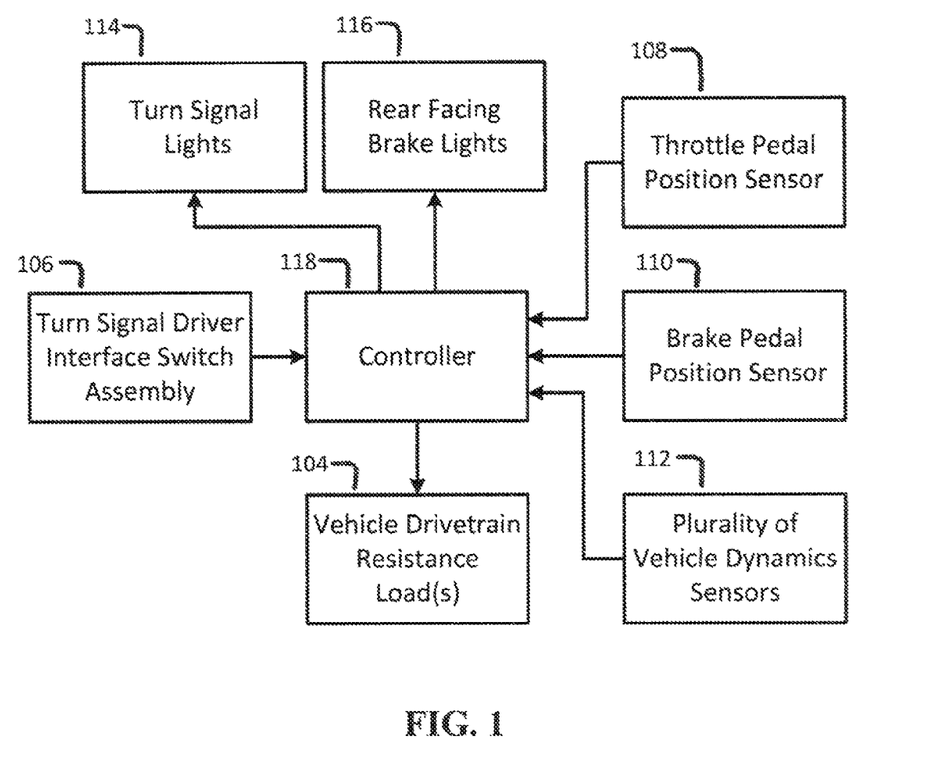
FIG. 1 illustrates a functional block diagram of the turn signal controlled vehicle drivetrain resistance load system.

Referring now to the drawings, a vehicle drivetrain resistance load control system is illustrated in FIG. 1. A vehicle drivetrain resistance load is represented in Block 104 and would typically consist of one or more means of adding a negative torque load to the wheels of the vehicle i.e. a torque against the forward motion of the vehicle that would tend to slow down the vehicle. A vehicle is considered any wheeled vehicle designed to be driven upon the roadway. The load would typically be applied ultimately to the drive wheels against the roadway surface and would consist of all forms of regenerative braking and/or any other decelerative load that tends to slow down the vehicle by converting forward motion kinetic energy to other forms of energy. These forms would be one or more of many sources within the vehicle, some of which may include, but not limited to the following: An engine load, a transmission load, an electrical energy generator load, a hydraulic load, a frictional load, a compression release engine brake load, an exhaust brake load, a rotational inertia device load, a mechanical energy storage device load, a pneumatic load, or any combination of the aforementioned loads or other loads. Regarding the engine load, this may be derived from the compression and friction loads internal to the engine which tend to be higher when engine rotational speed is higher. Regarding the transmission load, a ratio change to affect a higher engine rotational speed can be considered a vehicle drivetrain resistance load. Regarding the electrical energy generator load, this may be any load which serves to convert rotational kinetic energy into electricity which may then be stored in a battery, capacitive storage or similar means in order to be used as an energy source at a later time. Regarding the hydraulic load, this may be considered a hydraulic pump which would represent a load and a means to provide potential energy for storage as well. Regarding a frictional load, this may be considered the friction brakes that are typically activated by the driver's foot brake, i.e. service brake. Regarding the compression release engine brake load, this is typically a vehicle slow down means that is usually employed on a diesel engine vehicle. Referring to the exhaust brake load, this too is a device typically employed on a diesel engine vehicle which can be activated to restrict the flow of gasses through the exhaust system and thus create a vehicle drivetrain resistance load. Regarding the rotational inertia device load, this would typically comprise a device such as a flywheel. A flywheel load converts forward motion vehicle kinetic energy to rotational kinetic energy stored within the vehicle. Regarding the mechanical energy storage device load, this would typically comprise a spring load which would be wound to convert the forward motion vehicle kinetic energy to a potential energy stored in a configured material. Regarding the pneumatic load, this may consist of a gas pump that would convert forward motion vehicle kinetic energy to a pressurized gas chamber, wherein the gas pump may be a specialized dedicated pump or may be the vehicle engine itself. A Turn Signal Driver's Interface Switch is referred to in Block 106, which consists of a communication means, such as a contact switch or capacitive switch that the driver uses to input control commands of the vehicle turn signal system. These commands would typically consist of right turn, left turn, right lane change, left lane change, and turn signal cancel/off. Blocks 108 and 110 represent the inputs from the driver consisting of the throttle pedal position and the brake pedal position respectively, both of which are typically controlled by the driver's foot or feet and the inputs are generated from sensors usually affixed to the pedals. Regarding Block 110, an alternate sensor input could be a foot brake pedal force sensor. Block 112 represents a plurality of vehicle dynamic sensors which consists of any sensor that serves to quantify vehicle dynamics status comprising: steering angle sensor, accelerometer, Global Position System (GPS), yaw sensor, e.g. yaw rate sensor and vehicle speed sensors, e.g. wheel speed sensors. Block 114 represents the plurality of external turn signal red or amber colored lights as well as the driver's instrumentation turn signal displays. When a turn signal is considered "on", this refers to the continuously on flashing cycle, without regard to the actual illuminated lights which illuminate on-then-off in a repeated pattern as part of the turn signal "on" cycle. Turn signal activation status refers to either the turn signal being "on" and therefore in a light flashing cycle mode, or "off" with all lights continuously off. The turn signal activation status can be further defined when the activation status is on by the differential modes of automatic shut off turn signal and lane change turn signal. Automatic shut off turn signal is the mode where the vehicle's internal automatic shut of means is employed to determine the point where the turn signal shuts off, whereas the lane change turn signal mode is typically the condition of the driver's appropriate positioning of the turn signal lever, the turn signal is on, but upon release of the lever, the turn signal shuts off. In these two modes, the controller may be designed to exercise differing algorithms of vehicle drivetrain resistance loads. Block 116 represents the rear facing brake lights that are normally illuminated when the foot brake of the vehicle is applied, but the present invention may be configured such that the lights are alternately illuminated, independent of the foot brake status. Inputs from Blocks 106, 108, 110 and 112 are compiled in a controller represented in Block 118 wherein the controller typically consists of one or more on-board vehicle computers. When a driver is approaching a turn and physically activates the turn signal lever of Block 106 to initiate a turn signal command to the controller of Block 118, the turn signal is activated and the appropriate lights of Block 114 flash accordingly. When it is determined by the Controller in Block 118 via the input of the turn signal driver interface switch assembly of Block 106 that the turn signal is indeed a turn signal and not a lane change, AND the Throttle Position Sensor of Block 108 indicates a throttle position at zero, i.e. the driver's foot is off the pedal, then a command from the controller of Block 118 increases the magnitude of the vehicle drivetrain resistance load of Block 104, resulting in a slowing of the vehicle and thus an increased regenerative braking load on the vehicle. Since the present invention activates the additional load when the turn signal is activated, the flashing turn signal light at the rear of the vehicle serves to alert a following driver that the vehicle ahead is slowing, and thus the present invention counters the added risk of a rear end collision with the warning provided by the turn signal alone. The brake lights always remain ready to illuminate at the moment the driver presses the foot brake. When the controller of Block 118 changes the turn signal activation status to "off" through normal turn signal shut-off control computations or a driver's cancel input and thus turns off the turn signal lights of Block 114, then the vehicle drivetrain resistance load magnitude is expeditiously reduced to zero. If, while the turn signal of Block 114 is activated and a repeated turn signal input from Block 106 is received in the controller of Block 118, then the magnitude of the vehicle drivetrain resistance load is further increased to a higher level from the present level in order to slow the vehicle at a higher rate of deceleration and thus increase the level of regenerative braking. The load of Block 104 is therefore magnitudinally cumulative, i.e., each successive turn signal command input from the driver via Block 106 to the controller of Block 118 keeps increasing the load value above that of the present load. As a way of illustrating the magnitudinally cumulative effect, assume that the first turn signal input from Block 106 increases the load from Block 104 to 10% of full value. A second like turn signal input from Block 106 would increase the load to 20% of full value. A third like turn signal input would increase the load to 30% of full value and so on. Using the same preceding illustration, a manufacturer may design into their vehicle the effect wherein upon the second input of the turn signal, the rear facing brake lights of Block 116 could be commanded by the controller in Block 118 to illuminate independent of the brake pedal position. This increased load and illuminated brake light condition would be held until a driver's touching of the throttle pedal would trigger an expeditious extinguishing of the brake lights and the load magnitude of Block 104 reduction to zero. The percentage values in the preceding illustration are for the purpose of clarifying the effect only and a manufacturer would need to refine the design of their vehicle to select a suitable sequence of vehicle drivetrain resistance loads to optimize efficiency and drivability, including other vehicle inputs that may affect the resulting performance. In general, the controller in Block 118 serves to modulate the vehicle drivetrain resistance load according to a predetermined computer program algorithm.

Some existing hybrid electric vehicles (HEV) or electric vehicles (EV) vehicles have a foot brake that is designed to engage regenerative braking for the first portion of the brake pedal travel, then further travel of the brake pedal engages the friction brake. This serves to provide passive regenerative braking while driving the vehicle in a normal manner. The present invention provides the additional regenerative braking upon activation of the turn signal and said regeneration braking may be engaged independently of whether or not the foot brake is pressed by the driver. A manufacturer would have to coordinate the additional regenerative braking provided by the present invention with the regenerative, friction braking, and antilock braking such that a seamless, safe, yet satisfying brake performance and feel are achieved.

There may be a situation whereby a vehicle is not going to execute a turn, yet the driver would want to actively slow the vehicle down without using the foot brake. This may be the case when a driver comes upon a traffic slow down situation, or when entering a lower speed limit zone. This may also be desired when a vehicle is descending a long mountain grade and a steady vehicle speed is desired. In this case, allowing regenerative braking would be desirable from the driver's standpoint and the present invention allows for this in the following manner: If the vehicle is designed with a dedicated turn signal cancel button within the turn signal driver's interface switch assembly, there could be a designed-in feature of the vehicle whereby if the turn signal activation status is off, AND the throttle pedal position is zero, AND the "turn signal cancel" button is actuated, then the vehicle drivetrain resistance load is increased, with simultaneous actuations of the cancel button further increasing the load such that the vehicle drivetrain resistance load is magnitudinally cumulative in this mode also. Each level of load magnitude introduced is held constant until the moment the throttle pedal is pressed by the driver, wherein the load is expeditiously reduced to zero.

Figure 2:
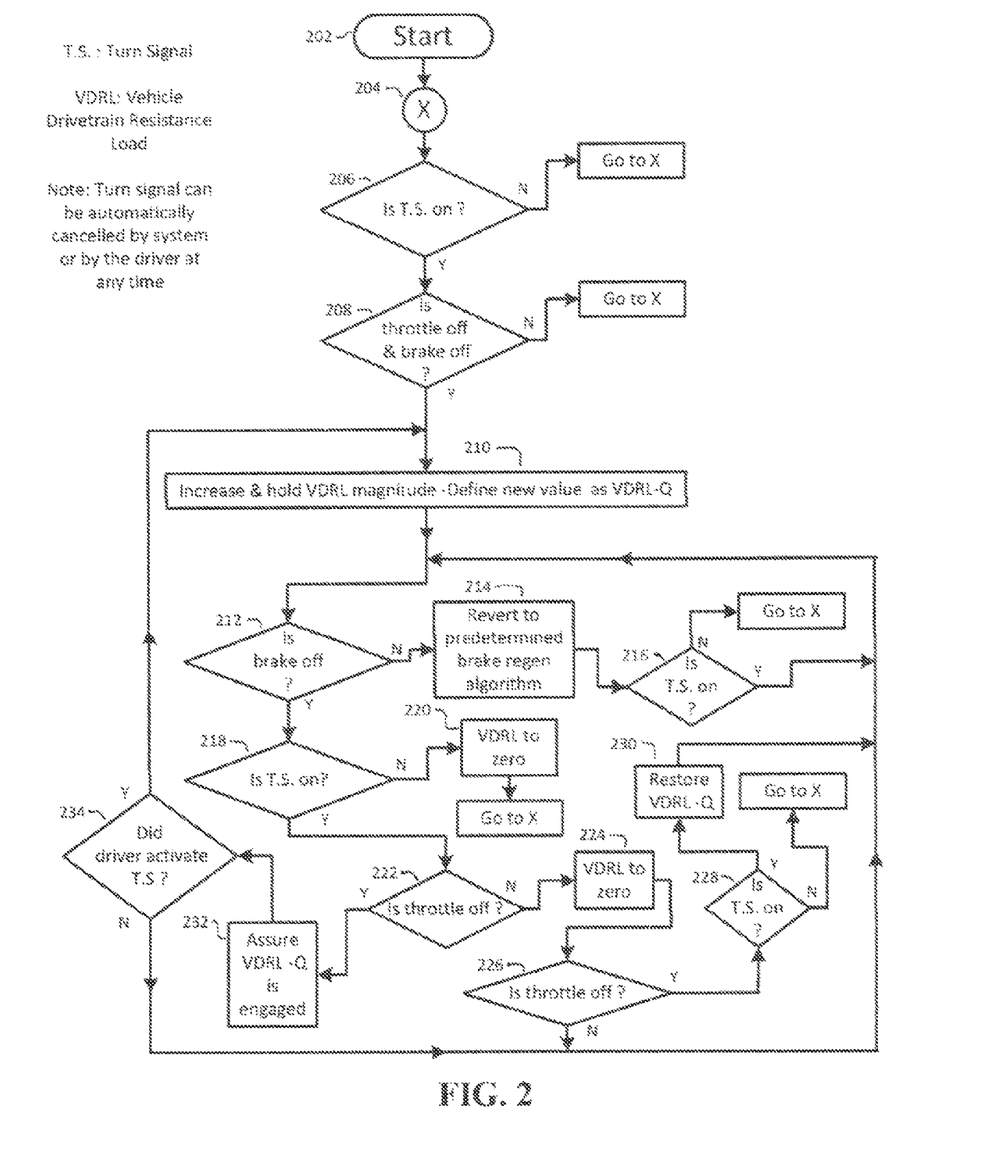
FIG. 2 depicts a simplified version of the flow chart used in the turn signal controlled vehicle drivetrain resistance load system.

Referring now to the flow chart diagram in FIG. 2, starting in step 202 and proceeding through Point X at step 204 to step 206 wherein it is detected if the turn signal status is on. If no, then the logic flows back to point X at step 204 and then back again to step 206. But if yes at step 206, then the logic proceeds to step 208, wherein it is detected if both the throttle is off (position zero) and the foot brake is off (position zero). If no, then the logic proceeds from step 208 to Point X at step 204 and then back again to step 206. If yes at step 208, then the logic proceeds from step 208 to step 210, wherein the magnitude of the vehicle drivetrain resistance load is incrementally increased and the new magnitude is then defined as VDRL-Q for future reference. In the case of an HEV or EV, this is the step where the regenerative braking is increased and kinetic energy is stored. From step 210, the logic proceeds to step 212 wherein it is determined if the foot brake is off. If no, then since the foot brake has been applied by the driver, the logic proceeds from step 212 to step 214 wherein the controller reverts to a new algorithm in which consideration is made that the brake is on and a new vehicle drivetrain resistance load profile is engaged. A manufacturer would design a predetermined algorithm that would consider all levels of regenerative braking. From step 214, the logic proceeds to step 216 wherein it is determined if the turn signal is on. If no, then the logic proceeds from step 216 to Point X at step 204 and on to step 206. If yes at step 216, then the logic proceeds to step 212. If yes at step 212 and thus it is determined that the brake is indeed off, then the logic proceeds from step 212 to step 218 wherein it is determined if the turn signal is still activated. If no, then the logic proceeds from step 218 to step 220 wherein the vehicle drivetrain resistance load is reduced in magnitude to zero, then proceeds to Point X at step 204 and on to step 206. If yes at step 218, then the logic proceeds to step 222. In step 222, it is determined if the throttle is in the off position. If no at step 222, then the logic proceed to step 224 and the vehicle drivetrain resistance load is reduced in magnitude to zero. From step 224, the logic proceeds to step 226 wherein it is determined if the throttle is in the off position. If no at step 226, then the logic proceeds to step 212. If yes at step 226, then the logic proceeds to step 228, wherein it is determined if the turn signal is on. If no at step 228, then the logic proceeds to Point X at step 204 and on to step 206. If yes at step 228, then the logic flows to step 230, wherein the VDRL-Q load is restored as the vehicle drivetrain resistance load. From step 230, the logic flows to step 212. If yes at step 222, the throttle is determined to indeed be off, then the logic flows to step 232 wherein the VDRL-Q is engaged if it was not, and maintained if it was engaged. From step 232, the logic continues to step 234 wherein it is determined if the driver has activated a turn signal input from the Turn Signal Driver's Interface Switch assembly in the same direction as the previous activation inputs. If no at step 234, then the logic proceeds to step 212. If yes at step 234, then the logic proceeds to step 210 to increase the vehicle drivetrain resistance load magnitude.

The logic represented in FIG. 2 allows for an added control of regenerative braking in addition to traditional, widely known regenerative braking control methods, with select examples of the flow logic illustrated in the FIGS. 3 through 8. Referring now to FIGS. 3 through 8, time is represented on the horizontal axis starting at the left and moving left to right and the relative vehicle drivetrain resistance load is represented on the vertical axis with zero at the bottom of the graph with increasing magnitudes progressing to the top of the graph. FIGS. 3, 4, 5, 6, 7 and 8 represent driving examples put forth to illustrate various driving scenarios and the influence and/or added efficiency gained with application of the present invention. Note that no specific values are associated with the vehicle drivetrain resistance loads indicated in FIGS. 3 through 8. This is intentional with respect this specification as only relative changes are indicated. For reasons of clarity related to this specification, abrupt transitions in the graphic illustrations of relative magnitudes are utilized in FIGS. 3 through 8. Also note that the regenerative braking is indicated as increasing and decreasing gradually at each transition point in order to allow the driver to retain vehicle control and illustrate manageable transitions. Practical applications of the present invention by a vehicle manufacturer would incorporate more refined transitions and specific magnitude values to improve vehicle responses and behavior and those skilled in the art would optimize control algorithms to achieve this. Effective regenerative braking can encompass a wide range of magnitudes and associated deceleration values on the vehicle can range generally from about 0.2 feet per second per second to about 12 feet per second per second. It is incumbent on a manufacturer to effectively incorporate the present invention to achieve internal product goals with regards to vehicle attributes, e.g. vehicle purpose, drivability, efficiency objectives and marketing goals upon which specific values, algorithms and design parameters are appropriately selected. In FIGS. 3 through 8, Point A represents where the driver activates the turn signal via the turn signal driver's interface switch assembly, Point B represents where the turn signal is shut off, usually by the turn signal controller as determined by measured vehicle dynamics or possibly by manual driver cancellation, Point C represents where the throttle is on, i.e. the driver's foot is pressing the throttle pedal, Point D represents where the throttle is off, i.e. the driver's foot is off of the pedal and the throttle is at zero, Point E represents where the driver's foot is on the foot brake in the portion of the pedal wherein regenerative braking is occurring, Point F represents where the driver's foot is on the foot brake in the portion where friction braking is occurring, e.g. the four wheel brakes are engaged, Point G represents where the foot brake is off.

Figure 3:
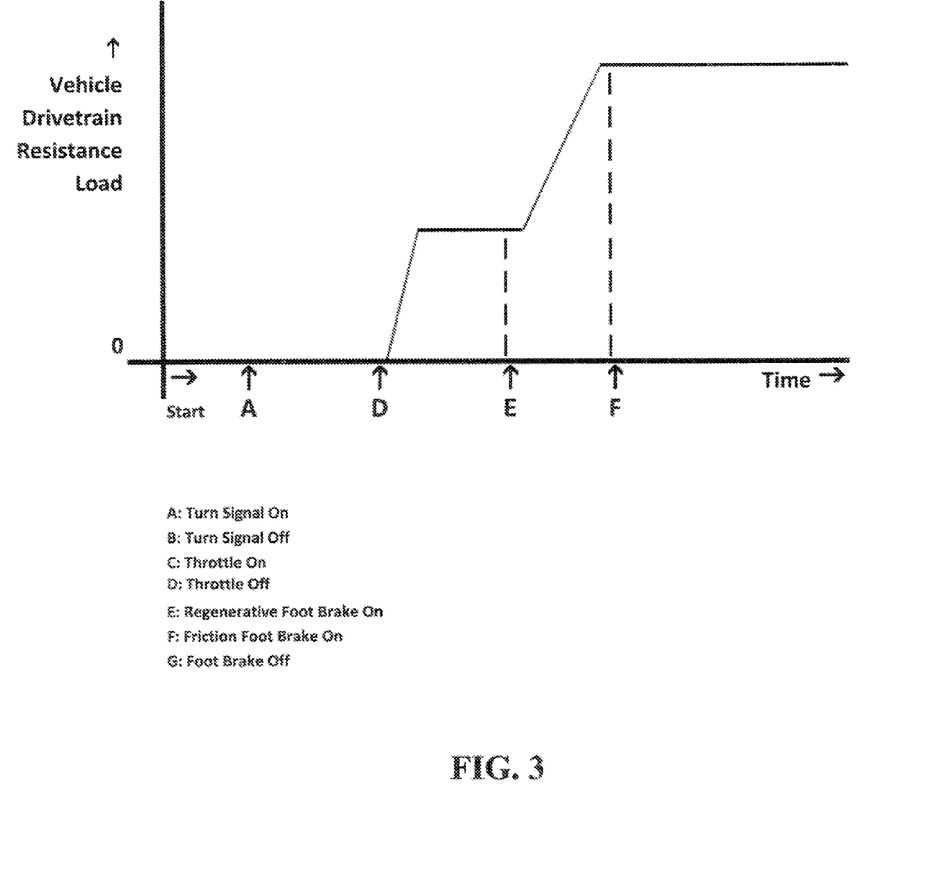

In FIG. 3, the turn signal is activated by the driver at Point A and the regenerative braking remains off until the throttle is then moved to "off" when the driver's foot is removed from the pedal at Point D, wherein a level of regenerative braking load is gradually engaged. This load level is held constant until the driver first presses the brake in the regenerative braking zone at Point E, where additional regenerative braking load is added. This load is controlled and modulated by the brake position until the foot brake is pressed far enough to engage the friction brakes at Point F. In this case, the regenerative braking load is not engaged until the driver's foot is removed from the throttle pedal in order to maintain control of the deceleration. Also, due to the activation of the turn signal at Point D, a relative higher magnitude of regenerative braking is engaged as compared to prior art systems.

Figure 4:
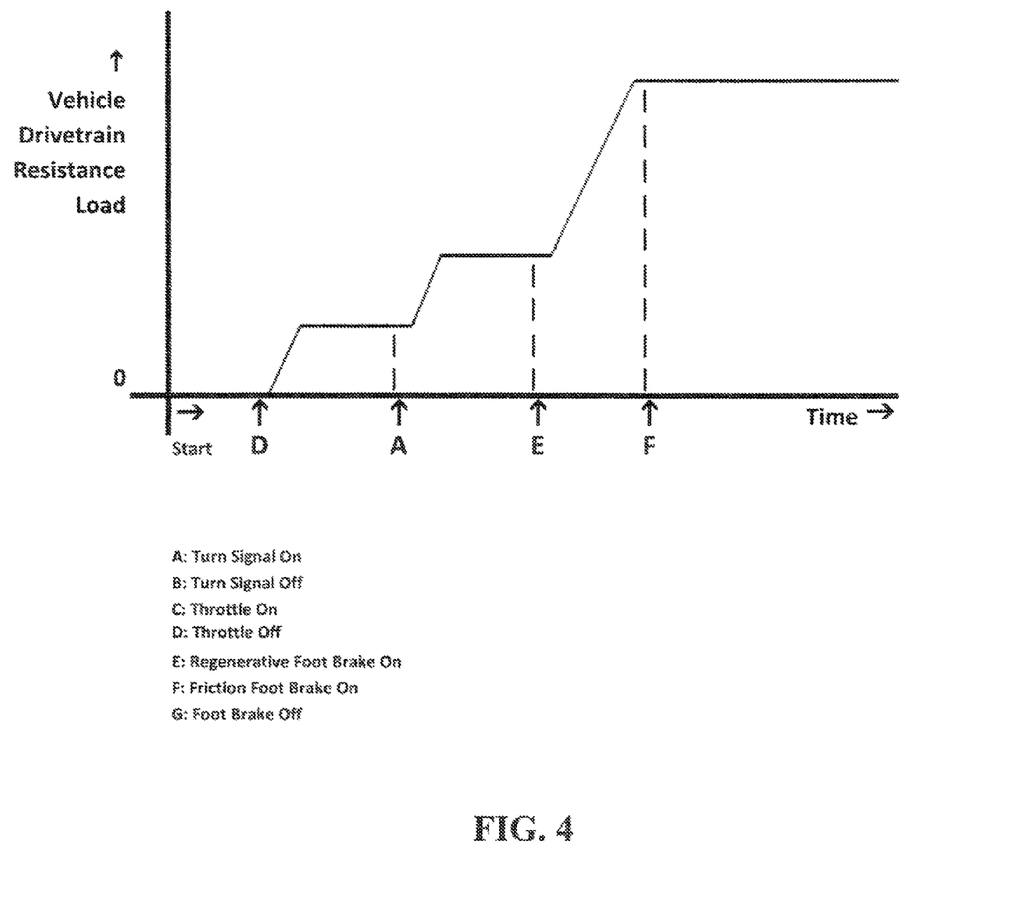

In FIG. 4, the throttle is first moved to the off position by the driver's foot being removed from the pedal at Point D. In this case, a small level of regenerative braking load is introduced and held constant. The turn signal is then activated at Point A and an additional level of regenerative braking is introduced and held per the present invention. Then the foot brake pedal is pushed at Point E by the driver and an additional level of regenerative braking is introduced and controlled and modulated by the foot brake pedal position until the foot brake is pressed far enough to engage the friction brakes at Point F. A manufacturer can design the vehicle with minimal regenerative braking when lifting off the throttle, yet introduce a greater regenerative braking upon activation of the turn signal. The turn signal is an indication to the vehicle control systems that a greater degree of near-term deceleration is needed as the vehicle will be slowing down for a turn.

Figure 5:
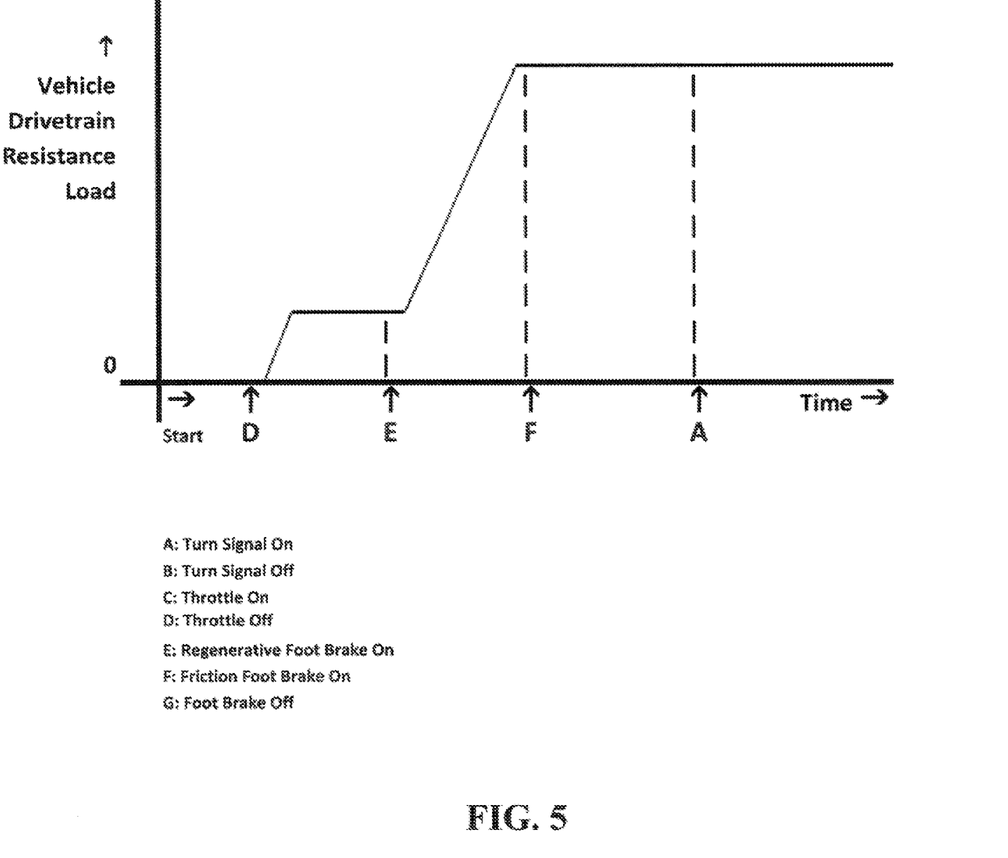

In FIG. 5, the sequence is throttle off at Point D, then the regenerative foot brake on at Point E, then the friction foot brake on at Point F, then turn signal is activated at Point A. This sequence will likely see no added efficiency gain over prior art system since the driver activates the turn signal late into the turn event sequence. Point E is a priority regenerative brake state since it is controlled and modulated by the driver and adding additional regenerative braking at Point A would likely not represent any additional benefit.

Figure 6:
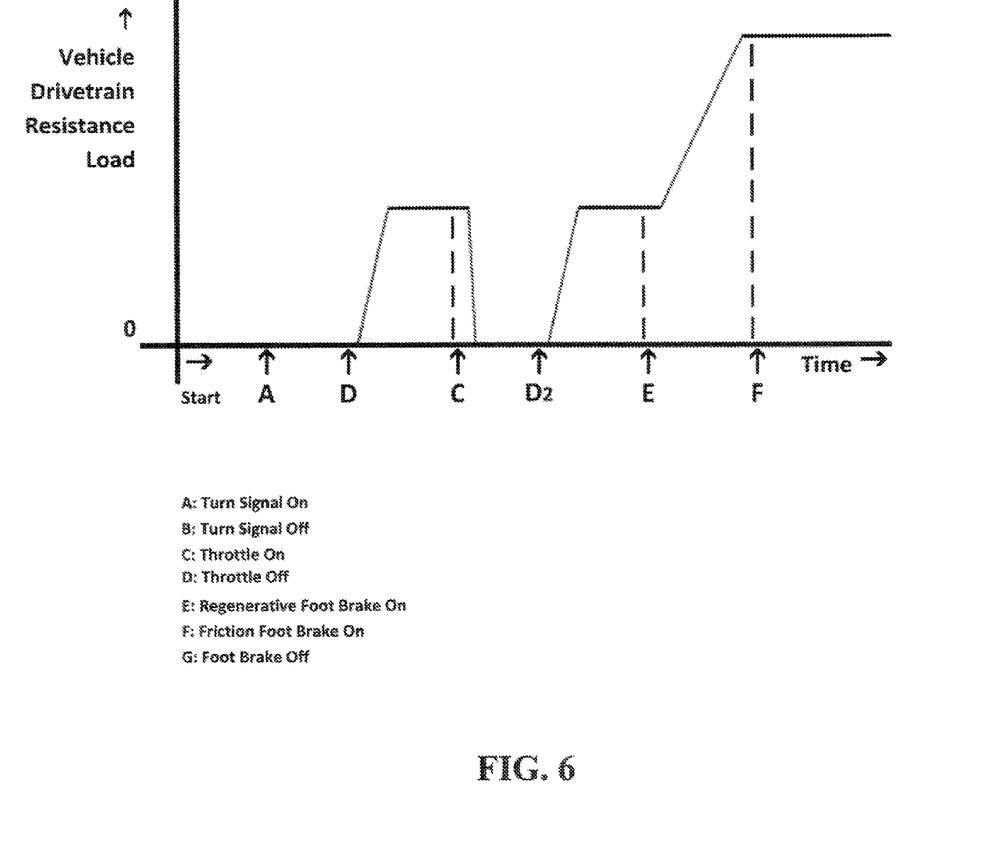

In FIG. 6, the sequence of events is similar to those of FIG. 3, except the throttle is re-engaged at Point C and then lifted again at Point D2. This figure illustrates the effect that when the throttle is re-engaged, that all regenerative braking is reduced to zero magnitude in order assure full vehicle control and speed modulation to the driver. However, as the turn signal remains on, and then the throttle is lifted at Point D2, then the previous regenerative braking load magnitude (see FIG. 2, VDRL-Q load) is restored in order to continue to slow the vehicle for the turn. This illustrates the level of modulation of regenerative braking that the driver can maintain with a high degree of control to maximize vehicle efficiency as well as turn execution control. The pattern of on-throttle, off-throttle input from the driver can potentially occur multiple times in a single turn cycle event.

Figure 7:
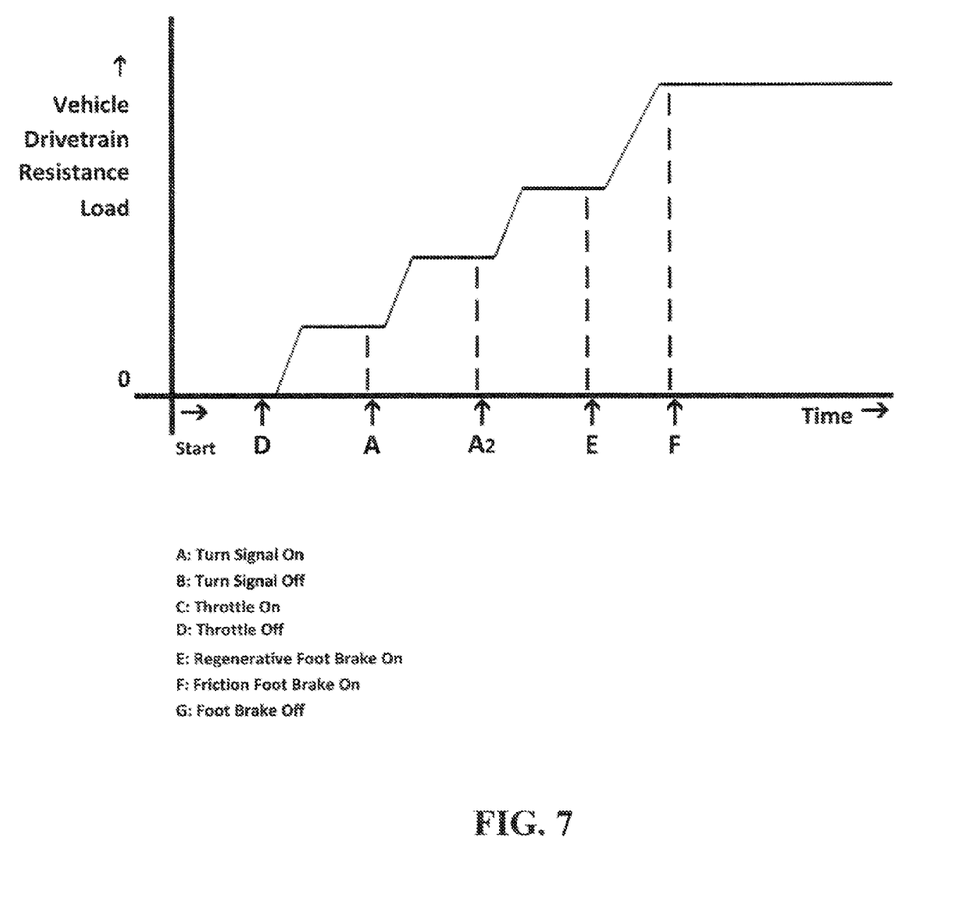

FIG. 7 illustrates the use of the active regenerative braking practice of activating the turn signal lever more than one time within a turn cycle event. As seen in FIG. 7, the turn signal is activated at Point A as well as at Point A2. Each time the driver moves the turn signal lever, the turn signal remains on and a higher level of regenerative braking load is introduced. Then the brake pedal is pressed by the driver at Point E and the regenerative foot brake is engaged. As the brake pedal is further depressed, the friction brake is engaged, beginning at Point F. This technique further optimizes the regenerative braking benefit in increasing overall vehicle efficiency. In theory, this technique seeks to minimize the level of friction braking occurring in a turn cycle event and maximizes the energy recapture. In this multiple activation mode of the turn signal, the manufacturer may choose to design the vehicle such that the rear facing brake lights would be illuminated at one of the selected turn signal activation points for safety reasons, alerting a following vehicle of an elevated rate of deceleration.

Figure 8:
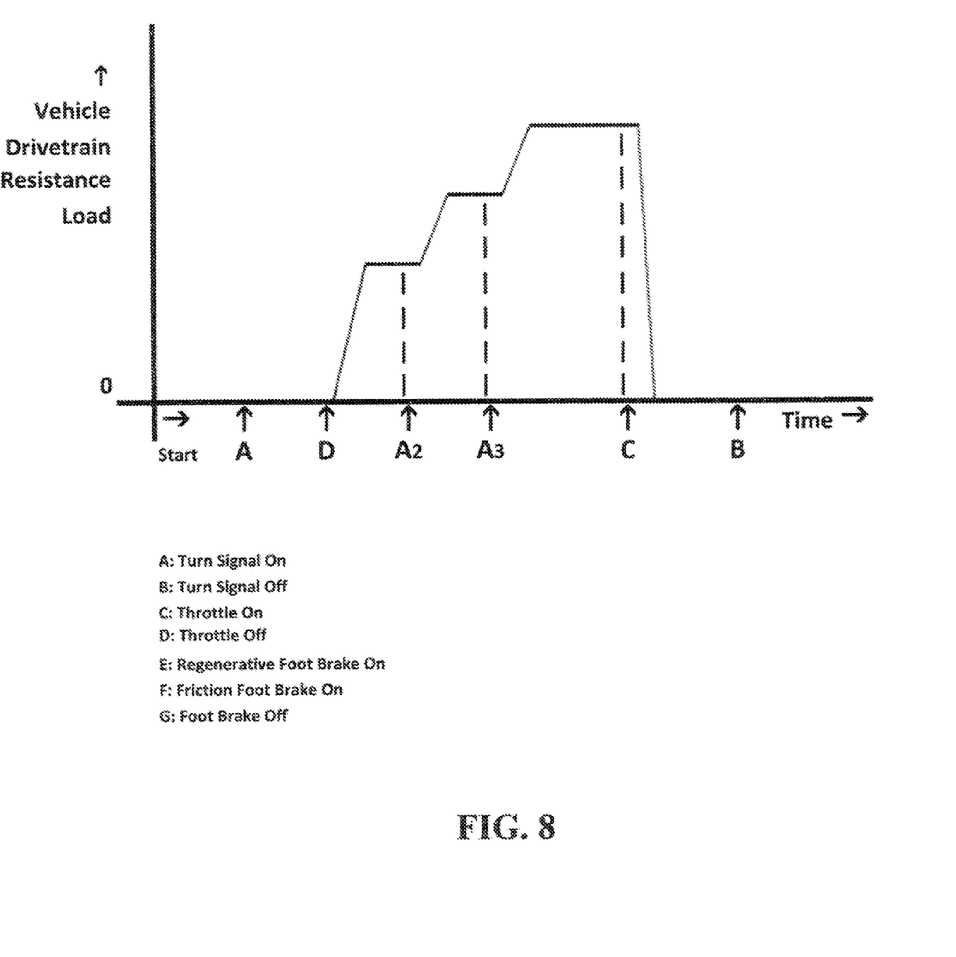
FIG. 8 depicts an example of a relationship of vehicle drivetrain resistance load vs. time for a driver's input sequence consisting of turn signal on; throttle off; turn signal re-activated; turn signal re-activated; throttle on; turn signal off.

FIG. 8 illustrates a situation where the no friction braking is employed in the entire turn cycle event, and 100% regenerative braking is employed in order to maximize the vehicle efficiency and prevent any wear to the friction braking components. In this sequence, the turn signal is activated at Point A, then the throttle is off at Point D, wherein the first engaging of the regenerative braking occurs, then the driver re-activates the turn signal input at Point A2, then again at Point A3, with each re-engagement increasing the regenerative braking magnitude. At a time after Point A3 but not indicated in FIG. 8, the turn is executed by the driver's turning of the steering wheel. At Point C, the driver re-engages the throttle while coming out of the turn and the turn signal is automatically shut off at Point B via turn signal controls. This technique takes a higher level of driver's skill to achieve and perhaps some practice, but it can achieve a perfectly safe, controlled method of executing a turn cycle event, complete with turn signal and brake lighting displayed to surrounding drivers. There is no friction braking loss created with this method and therefore maximum vehicle efficiency is possible in this type of turn execution.

To illustrate the present invention's benefits through a turn cycle event, an examination of vehicle travel distances is worthwhile by way of the following example: Assume that the turn signal is activated by the driver and simultaneously the throttle is lifted at a distance of 400 ft before the turn, then the brake is engaged at a distance of 150 feet before the turn, and then the turn is executed. With the present invention, a total of 400 feet of regenerative braking travel distance is achieved and it occurs at a higher regenerative magnitude. In contrast, a conventional HEV or EV with prior art regenerative braking via brake pedal only would not begin regenerative braking until 150 feet before the turn. The present invention not only increases the energy recapture, but reduces wear on the foot brake friction components. Increasing the regenerative braking time duration for each turn event is important because some energy storage systems, e.g. batteries, have a limit as to their charging rates. Assuming that regenerative braking is 50% efficient at returning vehicle forward motion kinetic energy to storage and back to vehicle forward motion, and assuming that a turn with turn signal is made once every mile of driving, then it is conceivable that the present invention could potentially improve the overall vehicle efficiency by as much as 6% using normal driving practices, which includes the diligent use of a turn signal. That would translate to a HEV vehicle with a normal fuel mileage of 50 miles per gallon would obtain up to 53 miles per gallon by employing the present invention and an EV with a normal range of 150 miles would obtain a range of up to 159 miles.

The present invention can be designed into a vehicle with a conventional internal combustion engine and transmission combination. Introducing a vehicle drivetrain resistance load would be best applied to a vehicle with a constant velocity transmission (CVT) for reasons of smoothness of ratio changes. In the event that the turn signal on such a vehicle is activated, then the CVT would be commanded to change to a higher output ratio, thus raising the engine speed and thus slowing the vehicle. Although this scenario does not recapture vehicle forward motion kinetic energy, it will serve to reduce the wear on the friction brake components and may enhance the drivability of the vehicle. In the case of a finite number fixed gear ratios automatic transmission, wherein there are a fixed number of gear ratios as in a 4-speed, 5-speed, or 6-speed conventional automatic transmission, the application of the present invention is possible as well. The application of the present invention could also apply to a double clutch transmission-equipped vehicle.

Application of the present invention requires little or no added cost if a vehicle's mechanical and electrical architecture is appropriate. Most modern vehicles are equipped to integrate the present invention into the design of the vehicle with relative ease. Usually, no added sensors, components, system communication lines or electrical components are required and just a change in computer programming algorithm is all that is necessary to apply the present invention. Sensor-controlled, intelligent turn signals are best suited to integrate with the present invention, although conventional mechanical trip-style turn signal systems can be utilized as well.

The driver of a vehicle equipped with the present invention can realize a monetary benefit as a result of using less fuel simply by using the turn signal normally. No special fuel saving techniques or tricks would be required from the driver. Therefore, the driver is motivated to use the turn signal more frequently, resulting in improved driver to driver communication and a reduction in the risk of a crash with another vehicle. Improved overall turn signal usage rates are a positive outcome of the present invention. Thus, all vehicles on a mass scale produced with the incorporation of the present invention will realize the benefits. It is likely that a manufacturer will obtain a higher EPA fuel mileage score with the present invention incorporated into the base vehicle design.

When a turn signal is activated by the driver and the vehicle drivetrain resistance load is subsequently increased as a result, it may be desirable to control the load magnitude in such a way as to obtain a constant deceleration of the vehicle regardless of the terrain or vehicle load. If for example, a turn signal is activated and the vehicle is on level ground approaching a turn, a given magnitude of regenerative braking load may be introduced. However, if the vehicle is on a downhill path and the turn signal is activated, a greater magnitude of regenerative braking load may be introduced. Conversely, if the vehicle is on an uphill path and the turn signal is activated, a lesser magnitude of regenerative braking load may be introduced. This could be accomplished within the vehicle control systems by monitoring the vehicle speed sensor, e.g. wheel speed sensor and appropriately adjusting the magnitude of the regenerative braking load to achieve a constant vehicle deceleration, regardless of terrain or vehicle load. A constant deceleration resulting from driver turn signal inputs makes for a more predictable vehicle behavior for the driver and thus improves the drivability and consistency of the vehicle behavior with activated turn signals.

With the present invention applied to a vehicle, the use of a vehicle's built-in Global Positioning System (GPS) for point to point navigation can have a profoundly positive impact in controlling the vehicle drivetrain resistance load via the use of the vehicle's turn signal. It is conceivable that a driver may not have to touch the foot brake while travelling point to point in a GPS prescribed route. For example, assume a driver is located at a start location and enters a destination location in the GPS and then proceeds to drive the vehicle by following the GPS recommended path. At a point when a GPS recommended pending turn approaches and the driver activates the turn signal at an appropriate point before the turn, the vehicle drivetrain resistance load can be modulated by the vehicle's control system using inputs of GPS location and other vehicle dynamics sensors such that the vehicle slow down to execute the GPS-prescribed and driver-confirmed turn would nearly perfectly match the ideally executed turn dynamics for the turn. In other words, the vehicle modulates speed via the vehicle drivetrain resistance load to enable the driver to readily follow the GPS-recommended path. The driver's active use of the turn signal while approaching the turn serves as a confirmation to the vehicle's internal control that the driver indeed intends to utilize the GPS-recommended route. Thus, a vehicle-controlled slowdown in turning situations will not come unexpectedly to the driver as the turn signal coincides with the route as recommended. Additionally, if the vehicle-induced deceleration approaching the GPS recommended turn is high enough, the vehicle internal control could illuminate the rear facing brake lights accordingly and extinguish them appropriately, all without a driver's input or pressing of the foot brake. In the event that the turn signal is not activated before a GPS recommended turn, then the vehicle performs as normal without any turn signal-induced vehicle drivetrain resistance load engaged. The vehicle will not slow down and the driver therefore remains in control and may then choose to execute the turn as recommended or go straight. The footbrake pedal and throttle pedal remain available to the driver to fine-tune a smooth turn execution and under all circumstances or even to stop completely if required, such as at a red light. The driver remains in control at all times and can always override and intuitively take control of the vehicle.

The present invention can be applied to enhance vehicle friction braking in inclement weather. The vehicle's controller can be programmed such that when the windshield wipers are on or were recently on, and the driver activates the turn signal, then the friction brakes can be automatically applied for a predetermined time duration, then turned off. This on-time of the brakes can be varied, based on the manufacturer's design and would typically have a time duration of about 0.1 seconds to 6 seconds. This method of increase-then decrease brake application is independent of the driver's application of the foot brake. What this achieves is that the brake surfaces, which are presumed to be wet from the present or recent windshield wiper activation, will be made drier via their automatic activation. When the driver does then apply the foot brake moments later, braking will be more effective due to the reduction in moisture on the friction surfaces. This is a function that would happen automatically with little or no detection from the driver's standpoint and would only be in effect when driving conditions are wet and when the turn signal is activated before the foot brake is applied. Wear on the brake surfaces as well as the effect on fuel mileage would both be negligible.

More aggressive and less aggressive driving may change how much turn signal-triggered regenerative braking is appropriate. It is conceivable that the present invention could monitor a driver's recent historical driving habits and adjust levels of regenerative braking on an ongoing basis in order to better match that driver's style. The option to incorporate this level of adaptive turn signal-induced vehicle drivetrain resistance load would be at the discretion of the manufacturer.

HEV or EV vehicles designed with both regenerative and friction brakes within the single brake pedal stroke have a design challenge to achieve a smooth brake feel while simultaneously and seamlessly managing the regenerative/friction transition. This type of foot brake design can result in an expensive vehicle braking system. Furthermore, the systems in the marketplace to date have received poor reviews for brake feel performance in some cases. The present invention allows a manufacturer the ability to engineer a simpler, less expensive, improved-feel, friction-brake-only foot brake while still utilizing a more targeted regenerative braking system via the turn signal activation.

The above described embodiments are set forth by way of example and are not for the purpose of limiting the invention. It will be readily apparent to those skilled in the art that obvious modifications, derivations and variations can be made to the embodiments without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Accordingly, the claims appended hereto should be read in their full scope including any such modifications, derivations and variations.

What is claimed is:

1. A regenerative braking system for a vehicle, comprising:
    a) a drivetrain resistance load for providing regenerative braking, for recapturing vehicle forward motion kinetic energy;
    b) a driver's turn signal interface switch assembly configured to send a turn activation signal upon activation of a driver's turn signal switch;
    c) a computer configured with programming for performing an algorithm to modulate a magnitude of regenerative braking of the drivetrain resistance load in response to a dynamic status of the vehicle, and to increase the magnitude of regenerative braking in response to a combination of the driver's turn activation signal and a driver's throttle pedal input position at zero.

2. The regenerative braking system of claim 1, wherein the drivetrain resistance load comprises at least one selected from the group consisting of:
    an electrical energy generator load,
    a hydraulic load,
    a rotational inertia device load, a mechanical energy storage device load, and a pneumatic load.

3. The regenerative braking system of claim 1, wherein the drivetrain resistance load comprises a device that converts vehicle forward motion kinetic energy to stored energy.

4. The regenerative braking system of claim 1, wherein the computer is further configured with programming for measuring the driver's recent historical driving habits, and modifying the algorithm to adapt to the driver's recent historical driving habits and to optimize regenerative braking system.

5. The regenerative braking system of claim 1, wherein the dynamic status of the vehicle is determined by at least one sensor selected from the group consisting of: throttle position sensor, foot brake pedal position sensor, foot brake pedal force sensor, steering wheel angle sensor, vehicle speed sensor, vehicle yaw sensor, accelerometer and a Global Position System.

6. The regenerative braking system of claim 5, wherein the dynamic status of the vehicle is determined by the Global Position System.

7. The regenerative braking system of claim 1, wherein a vehicle rear facing brake light is activated in response to the combination of the driver's turn activation signal and the driver's throttle pedal input position at zero and a predetermined vehicle deceleration.

8. A method of modulating a magnitude of regenerative braking of a drivetrain resistance load of a vehicle in response to a driver's use of a turn signal, said method comprising the steps of:
    a) modulating a magnitude of regenerative braking of the drivetrain resistance load in response to a dynamic status of the vehicle,
    b) sensing an input position of a driver's throttle pedal,
    c) activating a driver's turn signal switch to send a turn activation signal, and
    d) increasing the magnitude of regenerative braking in response to a combination of the driver's turn activation signal and the driver's throttle pedal input position being at zero.

9. The method of claim 8, further including the steps of:
    a) detecting a predetermined vehicle deceleration, and
    b) activating a vehicle rear facing brake light in response to the combination of the driver's turn activation signal and the driver's throttle pedal input position at zero, and the predetermined vehicle deceleration.

* * * * *